United States Patent [19]
Perger

[11] 3,788,668
[45] Jan. 29, 1974

[54] MUDFLAP AND ROCK EJECTOR COMBINATION FOR A REAR DUMP VEHICLE

[75] Inventor: Julius M. Perger, Cleveland, Ohio

[73] Assignee: General Motors Corporation, Detroit, Mich.

[22] Filed: Oct. 30, 1972

[21] Appl. No.: 302,237

[52] U.S. Cl...... 280/154.5 R, 280/158 A, 298/1 SG
[51] Int. Cl............................................ B62d 25/16
[58] Field of Search..... 280/154.5 R, 158 R, 158 A; 298/1 SG

[56] References Cited
UNITED STATES PATENTS

| | | | |
|---|---|---|---|
| 2,799,515 | 7/1957 | Lobozzo | 280/158 A |
| 2,872,211 | 2/1959 | Barrett | 280/154.5 R |
| 2,857,200 | 10/1958 | Hoppesch | 298/1 SG |

Primary Examiner—Robert R. Song
Attorney, Agent, or Firm—W. S. Pettigrew et al.

[57] ABSTRACT

A mudflap is attached by a pivotal connection to the underside of a dump body at a point located vertically above the rear dual tires of a rear dump vehicle and a rock ejector carried by the vehicle maintains the mudflap spaced from the tires when the dump body is in the lowered-carry-position and the raised-dump-position.

5 Claims, 4 Drawing Figures

MUDFLAP AND ROCK EJECTOR COMBINATION FOR A REAR DUMP VEHICLE

Co-pending patent application ser. No. 17,312, entitled Mudflap For A Rear Dump Vehicle, in the name of Knyszek et al and assigned to the assignee of this invention discloses a mudflap assembly which consists of a pair of pivotally interconnected sections that depend from the underside of the dump body. The two sections of the mudflap assembly are normally disposed in a transversely extending vertical plane with the attachment means being located to the rear of the dual tires and spaced a substantial distance from the pivotal axis about which the dump body is rotated. As a result, the mudflap assembly is lowered towards the ground whenever the dump body is raised to dump a load and, in order to prevent the mudflap from being damaged, a retracting mechanism is provided for drawing one of the sections toward the dump body and thereby shortening the vertical length of the mudflap.

This invention concerns a mudflap which is pivotally attached to the dump body at a point located vertically above the dual tires and adjacent to the hinge connection which supports the dump body on the frame of the vehicle. An arrangement of this type limits the amount of vertical movement experienced by the mudflap when the dump body is moved from the lowered to the raised position and therefore does not require any form of retracting mechanism of the type described above. However, inasmuch as the mudflap is attached to the dump body above the tires, spacer means must be provided for preventing the inner surface of the mudflap from contacting the tires.

Accordingly, the objects of the present invention are to provide a mudflap that is formed as a rigid plate with the upper end thereof pivotally connected to a dump body of a rear dump vehicle at a point vertically above the tires and combined with spacer means for maintaining the mudflap in substantially the same position when the dump body is in the lowered position and the dump position; to provide a mudflap and rock ejector combination for dual tires in which the rock ejector serves to maintain the mudflap spaced from the tires when the dump body is in a raised or lowered position; to provide a rock ejector for the dual tires of a rear dump vehicle in which the rock ejector rigidly supports a spacer member which is adapted to engage a pivoted mudflap and prevent the latter from contacting the tires; and to provide a spacer arrangement for a mudflap that is pivotally connected to the underside of a vehicle dump body forwardly of a vertical plane which is perpendicular to the longitudinal axis of the vehicle and is tangent to the most rearward part of the tire.

The above objects and others are realized in accordance with the invention by having an elongated bar attached at its upper end to the vehicle and located in a position whereby its lower end extends between the dual tires and serves as a rock ejector. In the preferred form, the rear edge of the bar rigidly carries a transversely extending tubular member which engages the inner surface of the mudflap and serves to space the latter from the tires. Thus, the bar serves the dual function of ejecting rocks which may be lodged between the tires and also maintains the mudflap in a spaced relationship relative to the tires when the dump body is in a lowered or raised position.

A more complete understanding of the invention will be derived from the following detailed description when taken with the drawings in which.

Figure 1:
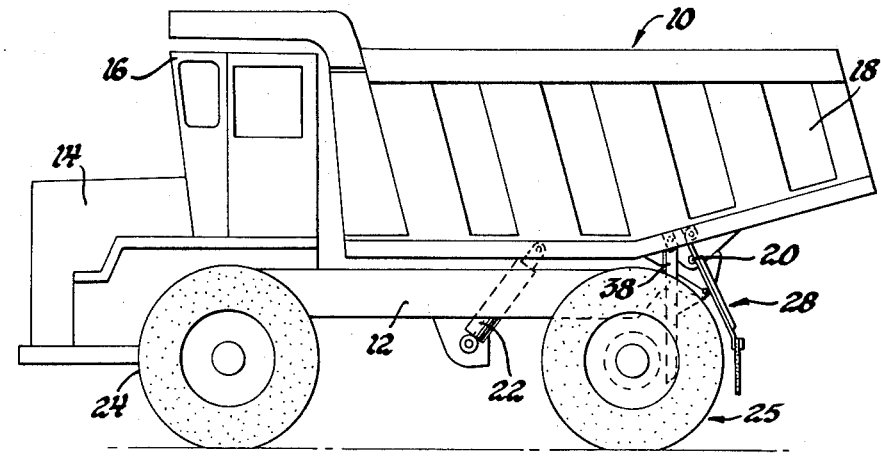
FIG. 1 is an elevational view showing a rear dump vehicle incorporating a mudflap arrangement made according to the invention.
Figure 2:
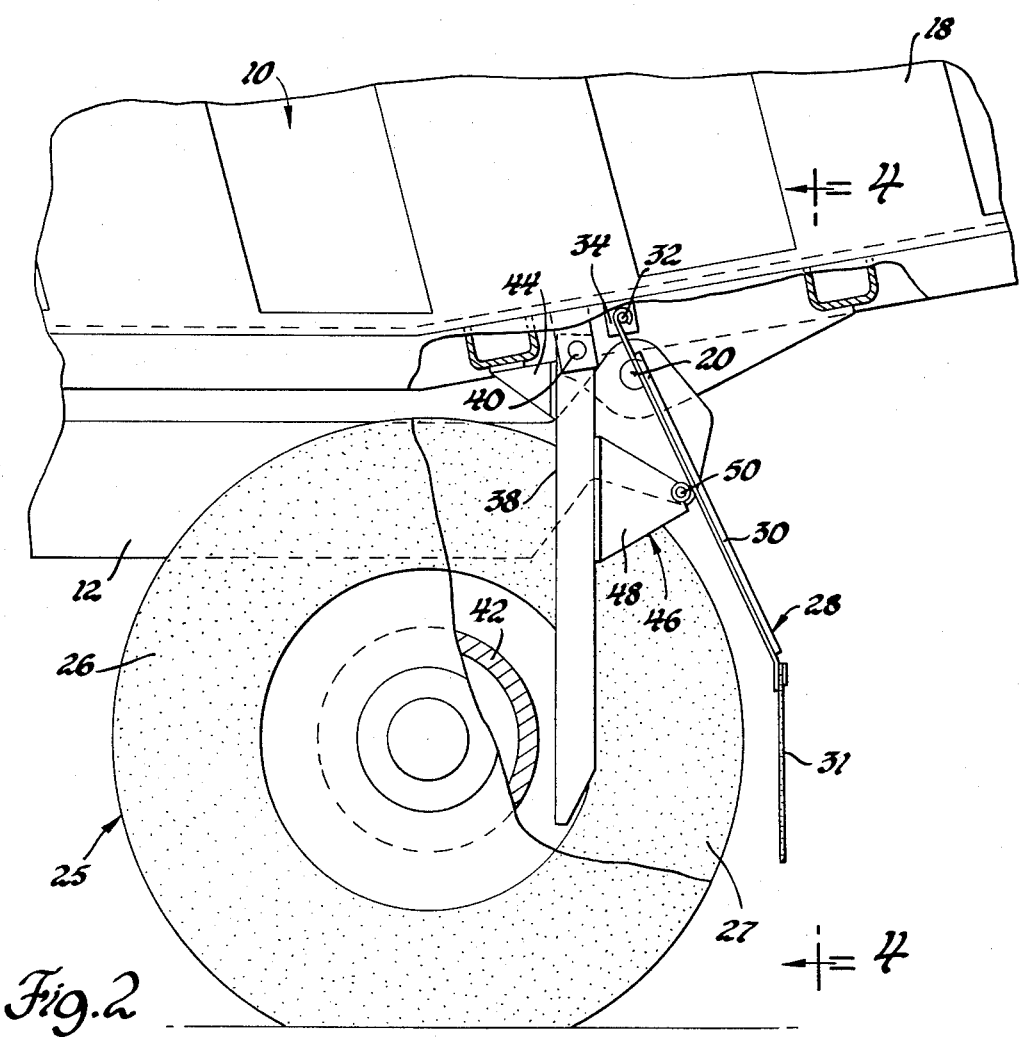
FIG. 2 is an enlarged view of the mudflap arrangement shown in FIG. 1.
Figure 3:
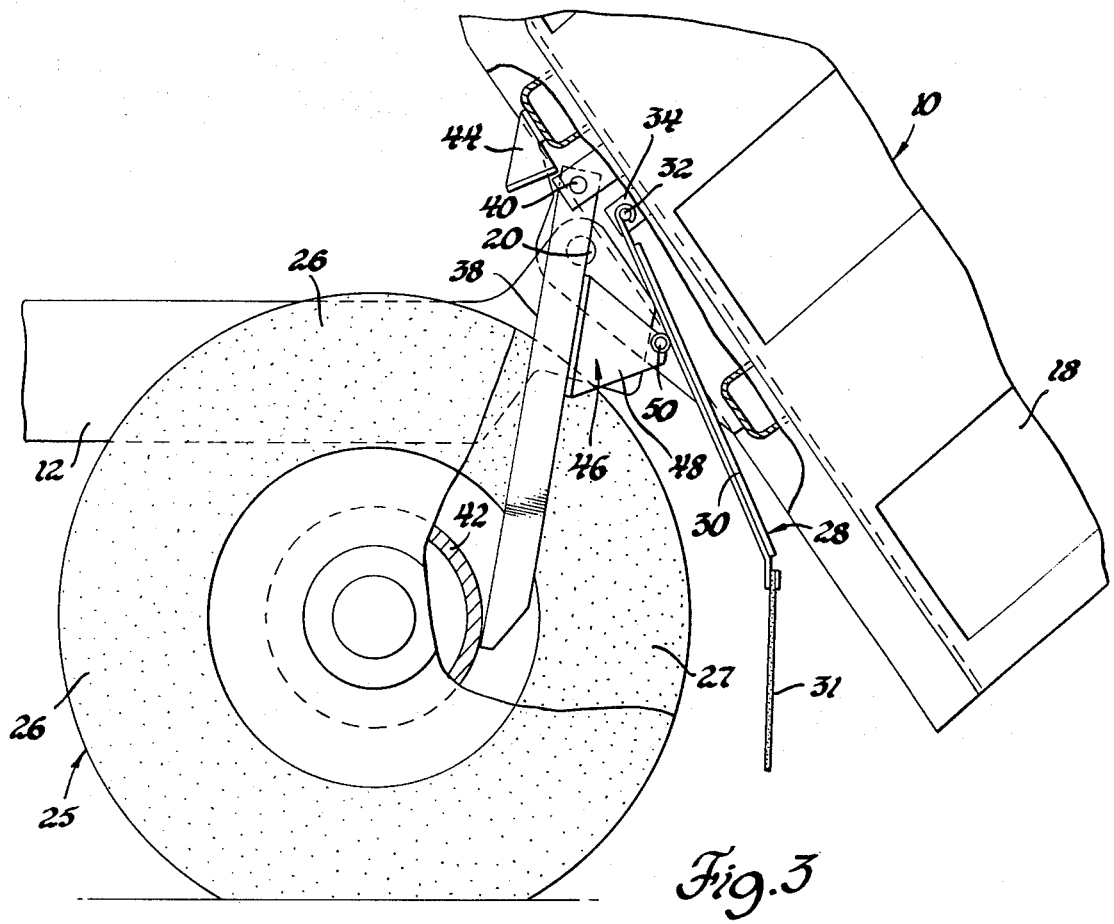
FIG. 3 is a view similar to FIG. 2 but shows the dump body in the raised-dump-position.
Figure 4:
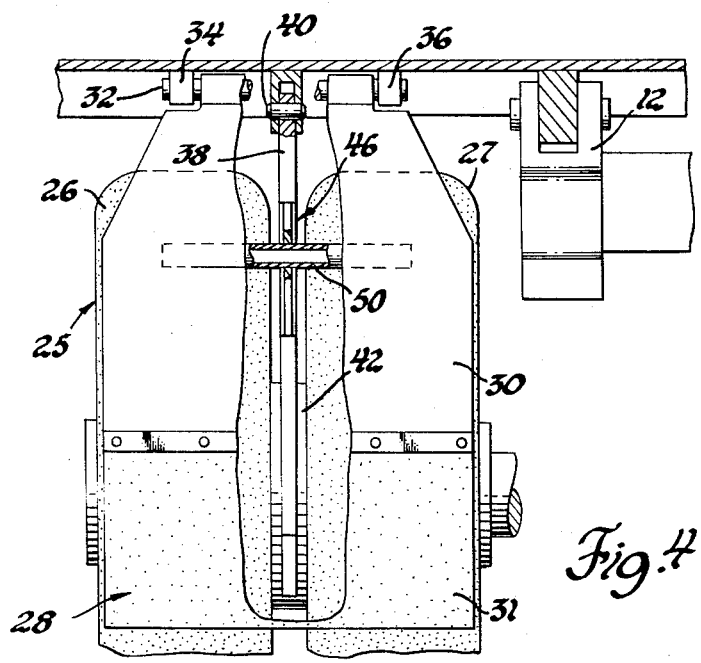
FIG. 4 is an enlarged end view of the mudflap arrangement taken on line 4—4 of FIG. 2.

Referring to the drawings and more particularly FIGS. 1 and 2 thereof, an off-highway rear dump vehicle 10 is shown having a frame 12 the forward end of which is provided with the usual engine compartment 14 and an operator's cab 16. To the rear of the cab 16, the main part of the frame 12 supports a dump body 18 that is connected to the frame by a hinge connection 20. As shown, the dump body 18 is in the lowered-carry-position and is adapted to be moved rearwardly about the horizontal pivot axis provided by hinge connection 20 to a raised-dump-position shown in FIG. 3. The latter movement occurs by actuation of hydraulic means such as a multi-stage hydraulic cylinder shown in FIG. 1 and indicated by the reference numeral 22. It will be noted that the dump vehicle 10 has front steerable wheels 24 and also rear wheels 25. Each rear wheel 25 includes dual tires 26 and 27 rotatably supported at each end of a transverse axle and located outboard of the frame 12 as shown in FIG. 4. In addition, a mudflap 28 is carried by the rear portion of the dump body 18 and is supported by the latter to the rear of each set of dual tires.

More specifically, the mudflap 28 comprises upper and lower sections 30 and 31 respectively which serve as a shield for the dual tires. The lower section 31 is rectangular in configuration and is made of an elastomeric material such as rubber and is fixedly attached at its upper end to the lower portion of section 30. The section 30 is also rectangular in configuration and is made from a steel plate with the upper end thereof pivotally connected to the underside of the dump body 18. In this regard, it will be noted that a pivot rod 32 located above the dual tires supports the upper end of the section 30 and, as seen in FIG. 4, has the opposite ends thereof rigidly mounted in brackets 34 and 36 in a manner whereby the longitudinal center axis of the pivot rod 32 is disposed parallel to the pivot axis provided by hinge connection 20.

When the dump body 18 is in the lowered-carry-position of FIG. 2, it is intended that the mudflap 28 be spaced from the dual tires and be located to the rear thereof so as to substantially shield the dual tires when viewed from the rear. During a dumping operation, it is also intended that the mudflap 28 maintains a spaced relationship relative to the dual tires and in order to maintain proper spacing in either of the aforementioned positions of the dump body, it will be noted that a rock ejector 38 is provided adjacent the mudflap 28.

The rock ejector 38 takes the form of an elongated steel bar with an upper portion thereof being connected by a pivotal connection 40 to the underside of the dump body 18 forwardly of the pivot rod 32. As seen in FIG. 4, the lower portion of the rock ejector 38 extends vertically downwardly between the dual tires 26 and 27 and to the rear of a wheel spacing member 42. Suitable stop means are provided such as stop member 44 to limit forward or clockwise rotation of the rock ejector 38 when the dump body 18 is in the lowered-carry-position. Thus, when a rock or other material is lodged between the tires 26 and 27 and strikes the ejector bar 38, it will be cammed from between the tires.

The aforementioned spacing of the mudflap 28 is provided by a spacer member 46 comprising a triangular portion 48 which is rigidly secured to the rear edge of the rock ejector 38 and fixedly supports a transversely extending cross bar in the form of a tubular member 50. The tubular member 50 engages the inner surface of the section 30 and as seen in FIG. 2 serves to space the mudflap 28 from the dual tires 26 and 27. Thus, even though the mudflap 28 is connected to the underside of the dump body 18 by a pivotal connection such as pivot rod 32 which is located forwardly of a vertical plane which is perpendicular to the longitudinal axis of the vehicle and is tangent to the most rearward part of the tire, the mudflap is prevented from engaging the tire by the spacer member 46. A similar situation exists when the dump body 18 is moved from the lowered-carry-position of FIG. 2 to the raisd-dump-position of FIG. 3 by the cylinder 22. In this instance, however, rather than the stop means 44 preventing forwardly movement of the rock ejector 38, the wheel spacing member 42 provides this function.

Various changes and modifications can be made in this construction without departing from the spirit of the invention. For example, the spacer member 46 could obviously be connected to the inner surface of the mudflap 28 and have a portion which would extend forwardly for sliding contact with the rear edge of the rock ejector 38. Such changes and modifications are contemplated by the inventors and they do not wish to be limited except by the scope of the appended claims.

I claim:

1. The combination of a rock ejector and mudflap for the rear dual tires of a rear dump vehicle having a dump body supported for pivotal movement between a lowered-carry-position and a raised-dump-position about a transversely extending axis, said mudflap including a rigid section and a flexible section located to the rear of said dual tires, means pivotally connecting the rigid section of the mudflap to the dump body for movement about an axis located above said tires and parallel to said transversely extending axis, said rock ejector having one portion thereof pivotally connected to the dump body by a pivotal connection located forwardly of said mudflap and having another portion thereof located between said dual tires, and means extending rearwardly from said rock ejector for engaging said mudflap so as to maintain the latter spaced from said dual tires when said dump body is in the lowered-carry-position and the raised-dump-position.

2. A rock ejector for the dual tires of a rear dump vehicle having a dump body pivotally supporting a mudflap at a point located above said dual tires, said rock ejector comprising an elongated bar having an upper portion and a lower portion, means formed with the upper portion for connecting the rock ejector to said vehicle whereby the lower portion extends downwardly between said dual tires, and means formed with said elongated bar for contacting said mudflap and maintaining the latter spaced from said dual tires when said dump body is in the lowered position and in the raised position.

3. In combination with a rear dump vehicle having a dump body supported for pivotal movement between a lowered-carry-position and a raised-dump-position about an axis extending transversely to the longitudinal axis of the vehicle, said rear dump vehicle including a rear axle having a wheel supporting dual tires at one end thereof, a mudflap member comprising a rigid section spaced from and located to the rear of said dual tires, means pivotally connecting the mudflap member to the dump body for movement about an axis located vertically above said tires and parallel to said transversely extending axis, a rock ejector member, means pivotally connecting an upper portion of said rock ejector member to the dump vehicle at a point whereby the lower portion of the rock ejector member is located between said dual tires, and means between said rock ejector member and said mudflap member and rigidly connected with one of said members for maintaining the mudflap member spaced from said dual tires when said dump body is in the lowered-carry-position and in the raised-dump-position.

4. The combination of claim 3 wherein said last mentioned means is a cross bar fixed to said rock ejector member and located along an axis perpendicular to the longitudinal axis of the rock ejector member.

5. The combination of claim 3 wherein said lower portion of the rock ejector member contacts said wheel when the dump body is located in the raised-dump-position.

* * * * *